No. 852,055. PATENTED APR. 30, 1907.
B. FESENMAIER, JR.
MOTOR FAN ATTACHMENT.
APPLICATION FILED JULY 18, 1906.

Witnesses

Inventor
B. Fesenmaier, Jr.,

By W. J. FitzGerald & Co.
Attorneys

UNITED STATES PATENT OFFICE.

BENJAMIN FESENMAIER, JR., OF NEW ULM, MINNESOTA.

MOTOR FAN ATTACHMENT.

No. 852,055.      Specification of Letters Patent.      Patented April 30, 1907.

Application filed July 18, 1906. Serial No. 326,727.

*To all whom it may concern:*

Be it known that I, BENJAMIN FESENMAIER, Jr., a citizen of the United States, residing at New Ulm, in the county of Brown and State of Minnesota, have invented certain new and useful Improvements in Motor Fan Attachments; and I do hereby declare the following to be a full, clear, and exact description of the invention, such as will enable others skilled in the art to which it appertains to make and use the same.

My invention relates to new and useful improvements in pulley construction and more particularly to that class adapted to be used in connection with fan motors and my object is to provide a construction of this class which can be readily applied to a fan motor and the power from the motor used to propel different devices.

A further object is to make the parts of the pulley interchangeable and varying in size to fit the different sized shanks in the fan motor.

Other objects and advantages will be hereinafter referred to and more particularly pointed out in the claims.

Figure 1:
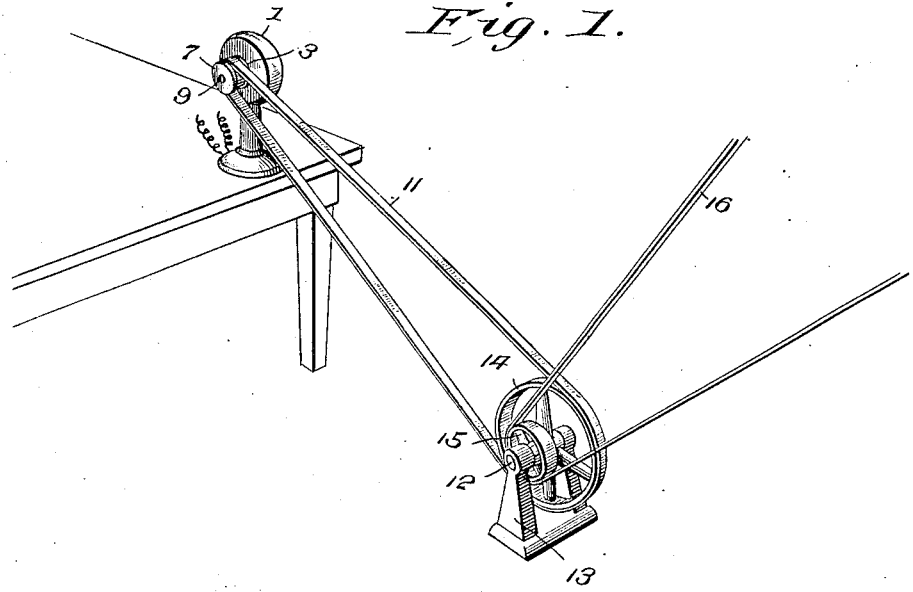
Figure 2:
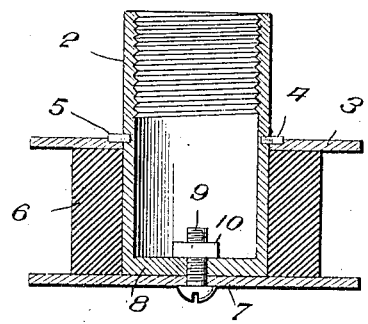

In the accompanying drawings which are made a part of this application Figure 1 is a perspective view showing my improved pulley attached to a fan motor and driving belts operatively secured thereto and Fig. 2 is a central sectional view through the pulley.

Referring to the drawings in which similar reference numerals designate corresponding parts throughout, 1 indicates an electric motor such as is commonly used to drive a fan to the shaft of which I secure my improved pulley, said pulley consisting of a tubular shaft 2 threaded at one end and adapted to be screwed upon the projecting end of the shaft in the motor. The tubular shaft 2 is interiorly threaded and it is my intention to have the bore in said shaft of varied diameters to fit the different sized shafts in the motors, while the exterior circumference of the shaft remains the same. A collar 3 is disposed on the shaft 2 and is held in position thereon by means of studs 4, said studs being screwed into the tubular shaft 2, so that when the collar 3 engages said studs it will be held from lateral movement in one direction. One face of the collar 3 is provided with notches 5 in which the studs 4 are adapted to seat, thereby preventing independent rotation between the shaft and collar. A band of hardened rubber or the like is then disposed around the tubular shaft 2 after which a collar 7 is secured to the closed end 8 of the tubular shaft 2 and is held thereon by means of a bolt 9, said bolt extending through the collar 7 and closed end 8 and is held in place therein by means of a nut 10. The collars 3 and 7 are greater in diameter than the band 6, whereby flanges are formed at each end of said band so that when the belt 11 is disposed on said pulley it will be held in position thereon by the flanges.

The object in producing a pulley of this class, is that it may be applied to the usual form of fan motors and the power of the motor used to operate washing machines, churns, pumps and the like.

In order to increase the driving capacity of the motor I provide a counter-shaft 12, said shaft being supported in any suitable way as by brackets 13. Mounted upon the shaft 12 is a pulley 14, around which the driving belt 11 is adapted to take, the pulley 14 being much larger than the pulley upon the motor. A pulley 15 is also disposed upon the shaft 12, said pulley being of less diameter than the pulley 14, said pulley having disposed therearound a driving belt 16 which is adapted to be placed into connection with the object being driven.

What I claim is:

1. A pulley of the class described comprising a tubular shaft interiorly threaded and having a closed end, a collar adapted to be disposed on said shaft, means to limit the movement of said collar on said shaft, a band on said tubular shaft, a second collar adapted to be secured to the closed end of said shaft, said collars being of greater circumference than said band, and means to secure said second collar to the end of said shaft.

2. A pulley of the class described comprising a tubular shaft having one of its ends closed, a collar having notches in one face thereof, studs in said tubular shaft and adapted to enter said notches, a collar adapted to be secured to the closed end of said shaft, a bolt extending through said collar and end whereby said collar will be held securely in place thereon and a band disposed around said shaft between said collars, said band being of less circumference than the collars.

In testimony whereof I have signed my name to this specification in the presence of two subscribing witnesses.

BENJAMIN FESENMAIER, Jr.

Witnesses:
EDWIN H. JUNI,
A. PFAENDER.